(12) United States Patent
Makke et al.

(10) Patent No.: US 9,710,402 B2
(45) Date of Patent: Jul. 18, 2017

(54) METHOD AND APPARATUS FOR SECURING AND CONTROLLING INDIVIDUAL USER DATA

(71) Applicant: FORD GLOBAL TECHNOLOGIES, LLC, Dearborn, MI (US)

(72) Inventors: Omar Makke, Lyon Township, MI (US); Manpreet Singh Bajwa, Novi, MI (US); Oleg Yurievitch Gusikhin, West Bloomfield, MI (US); Perry Robinson Macneille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/937,222

(22) Filed: Nov. 10, 2015

(65) Prior Publication Data

US 2017/0132157 A1    May 11, 2017

(51) Int. Cl.
| | | |
|---|---|---|
| *H04L 9/32* | (2006.01) | |
| *G06F 12/14* | (2006.01) | |
| *H04L 29/06* | (2006.01) | |
| *G06F 21/62* | (2013.01) | |

(52) U.S. Cl.
CPC ...... *G06F 12/1408* (2013.01); *G06F 21/6227* (2013.01); *H04L 63/061* (2013.01); *H04L 63/062* (2013.01); *H04L 63/0853* (2013.01); *H04L 63/0876* (2013.01); *G06F 2212/1052* (2013.01); *G06F 2221/2143* (2013.01)

(58) Field of Classification Search
CPC .................................................. G06F 12/1408
USPC .......................................................... 713/171
See application file for complete search history.

(56) References Cited

U.S. PATENT DOCUMENTS

| | | | |
|---|---|---|---|
| 5,664,110 A * | 9/1997 | Green ................. | G06Q 10/087 705/26.81 |
| 2002/0095557 A1* | 7/2002 | Constable ............. | G06F 3/0614 711/163 |
| 2008/0071611 A1 | 3/2008 | Lovett | |
| 2010/0211770 A1* | 8/2010 | Alrabady ............... | G06F 21/62 713/150 |
| 2013/0117857 A1 | 5/2013 | Zimmermann | |
| 2013/0171968 A1 | 7/2013 | Wang | |
| 2013/0282448 A1 | 10/2013 | Rydbeck et al. | |
| 2014/0164718 A1 | 6/2014 | Van Schaik et al. | |
| 2014/0172518 A1 | 6/2014 | King et al. | |
| 2016/0027399 A1* | 1/2016 | Wilde ................... | G06F 13/382 345/520 |
| 2016/0253348 A1* | 9/2016 | Mauti, Jr. ......... | G06F 17/30129 707/692 |

* cited by examiner

*Primary Examiner* — Christopher Brown
(74) *Attorney, Agent, or Firm* — Jennifer Stec; Brooks Kushman P.C.

(57) ABSTRACT

A system includes a processor configured to transfer a newly generated encryption key for a newly paired device to the device and utilize the encryption key to create and encrypt a new virtual storage space corresponding to the device and accessible using the encryption key on a memory connected to the processor.

15 Claims, 4 Drawing Sheets

METHOD AND APPARATUS FOR SECURING AND CONTROLLING INDIVIDUAL USER DATA

TECHNICAL FIELD

The illustrative embodiments generally relate to a method and apparatus for securing and controlling individual user data.

BACKGROUND

Vehicle computing systems frequently are capable of connection with a local hand-held device, such as a cellular phone. These connections, often established over WiFi or BLUETOOTH, typically involve transfer of data from the device to the vehicle computer, which may result in storage of some sensitive user-specific information. For example, without limitation, a user contact list on the device may be used to populate a vehicle-stored contact list. This list may contain information that one user does not wish to share with another, but at the same time the user may want the list to be populated in order to use a vehicle telematics system to make phone calls while in the vehicle. The desire not to share information may be especially relevant with regards to rental vehicles, which the user may only possess temporarily, but which may be equipped with telematics systems for use during rental.

SUMMARY

In a first illustrative embodiment, a system includes a processor configured to transfer a newly generated encryption key for a newly paired device to the device and utilize the encryption key to create and encrypt a new virtual storage space, corresponding to the device and accessible using the encryption key, on a memory connected to the processor.

In a second illustrative embodiment, a computer-implemented method includes generating a new, unique encryption key on the basis of detecting a new device newly paired and connected to a vehicle computing system (VCS). The method also includes creating a new virtual space for storing data retrieved from the new device once the key has been generated. The method further includes encrypting the data with the new encryption key and sending the encryption key to the new device.

In a third illustrative embodiment a non-transitory computer-readable storage medium, stores instructions that, when executed, cause a processor to perform a method including receiving a request, at a vehicle, from a remotely connected device to delete data in a virtual storage space assigned to the device on a vehicle memory. The method also includes receiving an encryption code in conjunction with the request and deleting the data if the encryption code is usable to decrypt the data stored in the virtual storage space.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
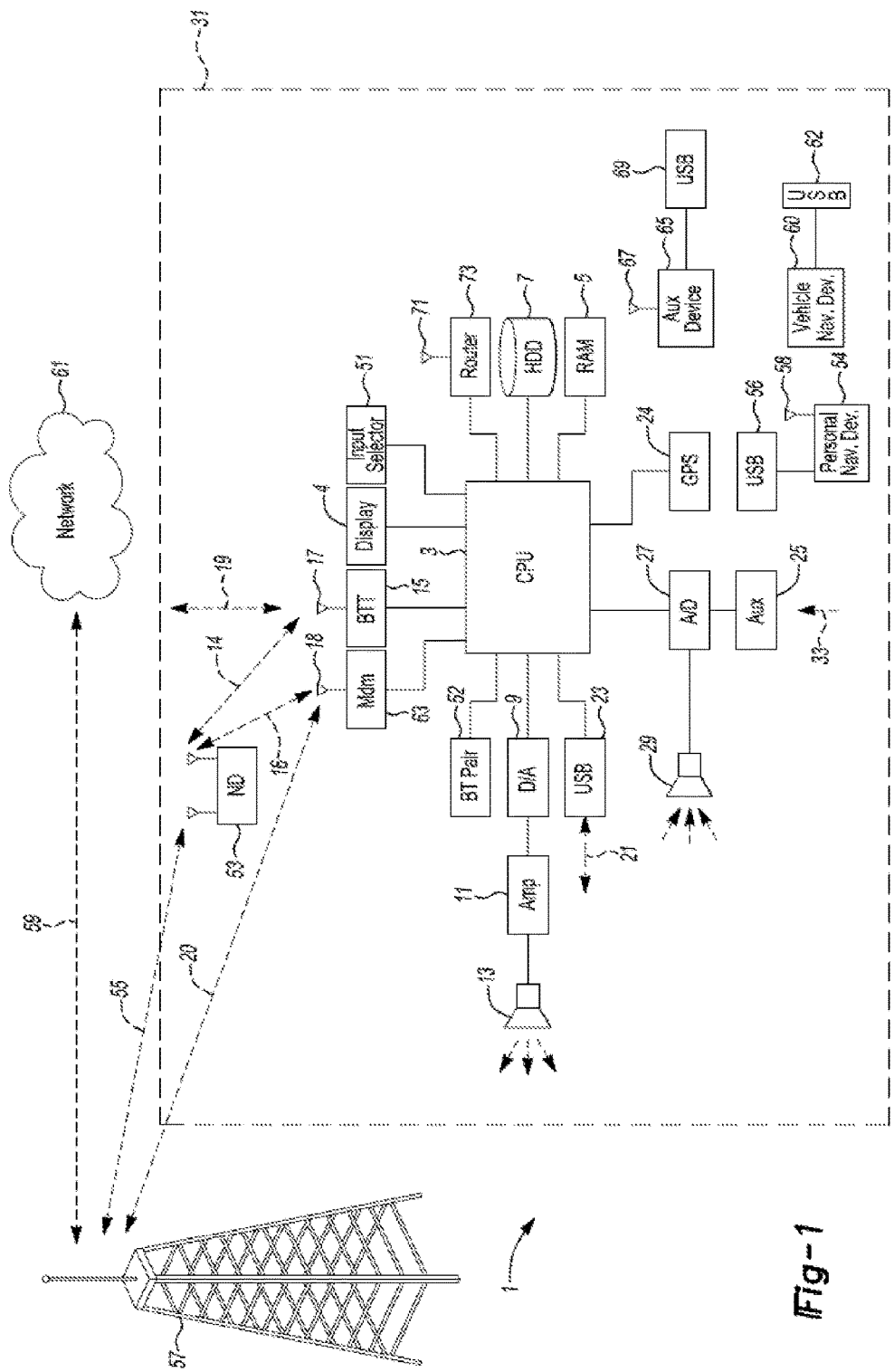
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

When a user enters a vehicle equipped with a telematics system, such as FORD MOTOR COMPANY'S SYNC system, there may be an attempt to connect to one or more paired devices that are carried by the user. In the process, data from the device(s) may be downloaded or updated on the in-vehicle memory. If multiple devices are present, there is a possibility of one device user accessing another device user's information stored on the vehicle.

For example, a driver in a vehicle may say "call Fred" to make a handsfree call using a vehicle telematics system. Fred's name and number may be downloaded from a user phone and stored on a telematics system memory, in order for the telematics system to understand the command. The driver may prefer that this information be deleted when the driver leaves the vehicle, for privacy purposes. Also, if there is an accident, for example, the driver may also want the relevant information deleted so that a service repair technician cannot access private data.

Figure 2:
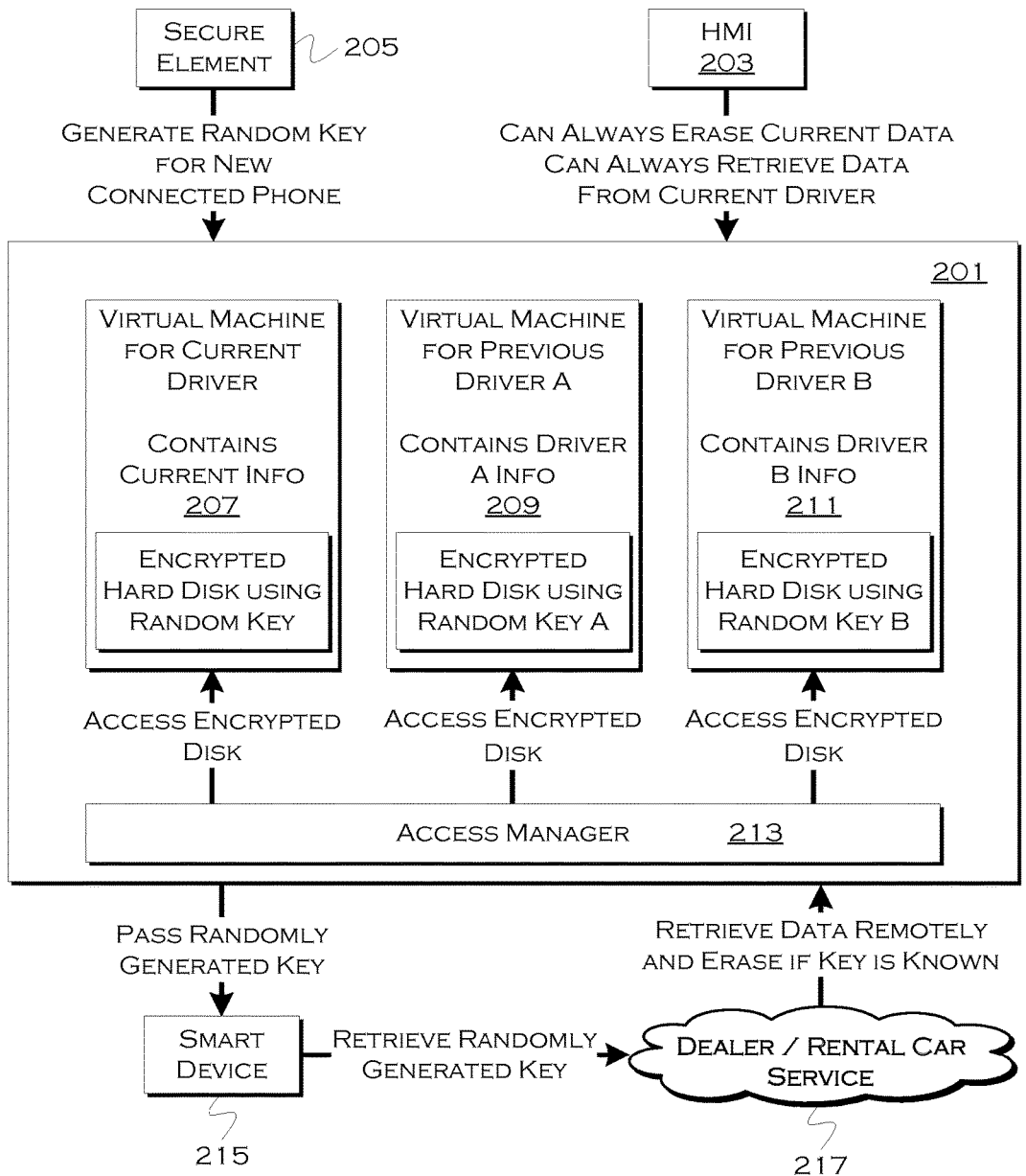
FIG. 2 shows an illustrative example of an architecture including secure user-specific data-stores.

FIG. 2 shows an illustrative example of an architecture including secure user-specific data-stores. In this illustrative example, a secure system 205 generates a key for a particular device. This key is assigned to the device, and is subsequently used to decrypt and access the data stored with respect to the particular device. The key is passed to the smart device 215 and is stored by the smart device for later use when accessing or deleting data.

A vehicle HMI 203 can be used to access any "current data" for a "current driver" (which is the device that is currently connected, although the device owner may not actually be a driver). This HMI can also be used to erase any current data, since the fact that the device is connected is indicia that an authorized "eraser" is in the vehicle.

For each driver/occupant device that is connected at some point to the vehicle, the system 201 uses the random key to encrypt the data from the devices and create virtual storage partitions 207, 209, 211. An access manager running on the telematics system, for example, can control individual device access (local or remote) to the virtual partitions.

Since the smart device stores the encryption key assigned to that device, and since the telematics system can connect to the cloud 217 (through a cellular network, for example), the key can be used when the device is remote from the vehicle to instruct deletion of some or all data in the storage partition corresponding to the requesting device.

Figure 3:
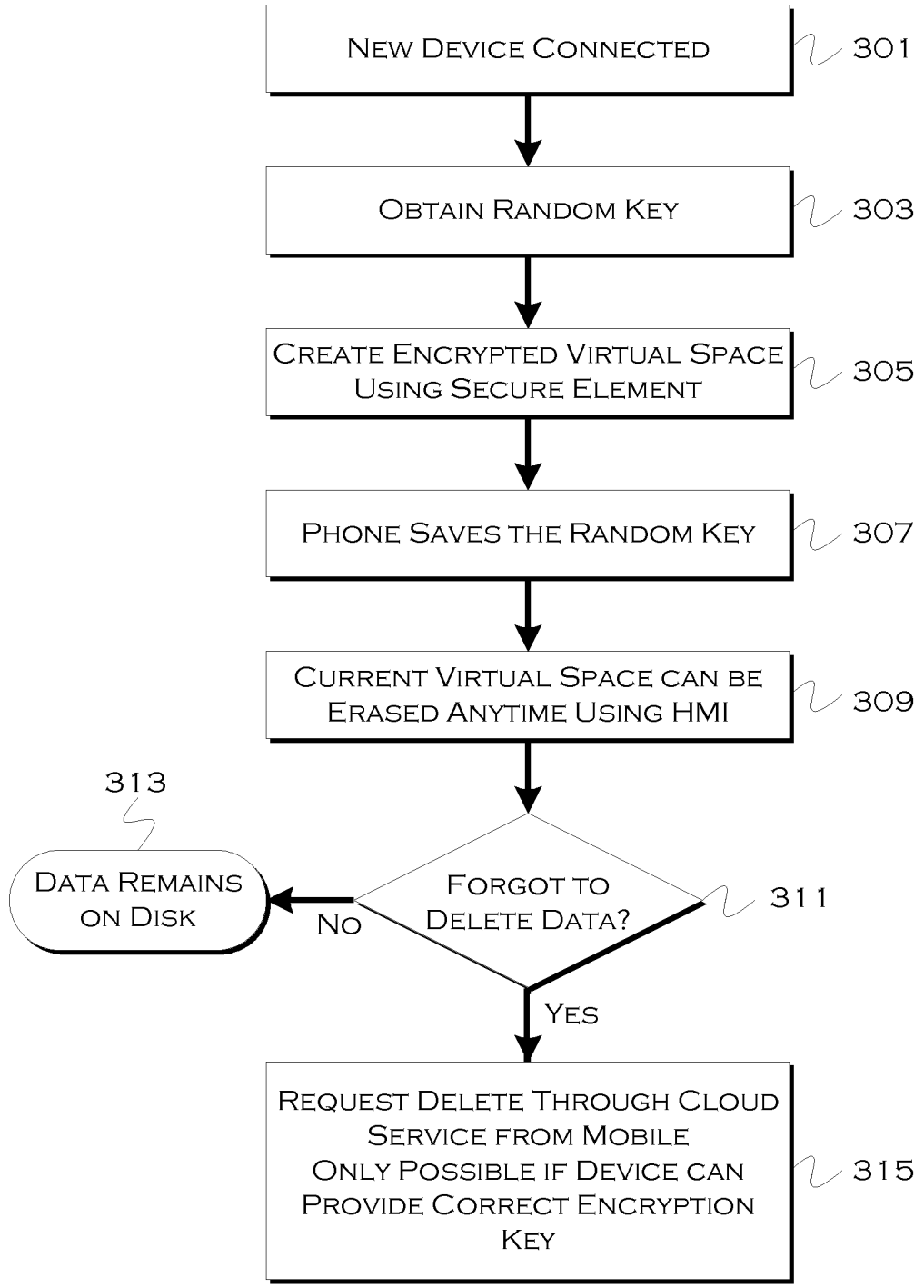
FIG. 3 shows an illustrative example of a process for securely storing user data.

FIG. 3 shows an illustrative example of a process for securely storing user data. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process begins when a new device is connected to the telematics system or vehicle computing system 301. A random key for the new device is generated 303. If the device has been previously connected (and thus already has a key), the key may be transferred from the device to identify a storage sector already created for that device and to decrypt existing data and to add new data to the sector.

In this example, the newly generated key is used to create encrypted space corresponding to that device 305. Since the key is device specific, only that device that stores the key should be able to provide the needed information to decrypt this data upon future connection. The random key is sent to the phone or device as well, for storage and use in later access requests 307.

While the device is still connected, any and all data stored in the telematics memory may be erased or altered using the vehicle HMI 309. If, however, the user forgets to delete the data 311 (or decides after leaving the vehicle that the data should be deleted), the data will persist in the vehicle memory 313 (albeit in encrypted storage). If the user later wishes to delete the data, the user can connect to the vehicle remotely (possibly through an intermediary server) and request deletion of the data remotely, by providing the proper access key for the data 315.

Figure 4:
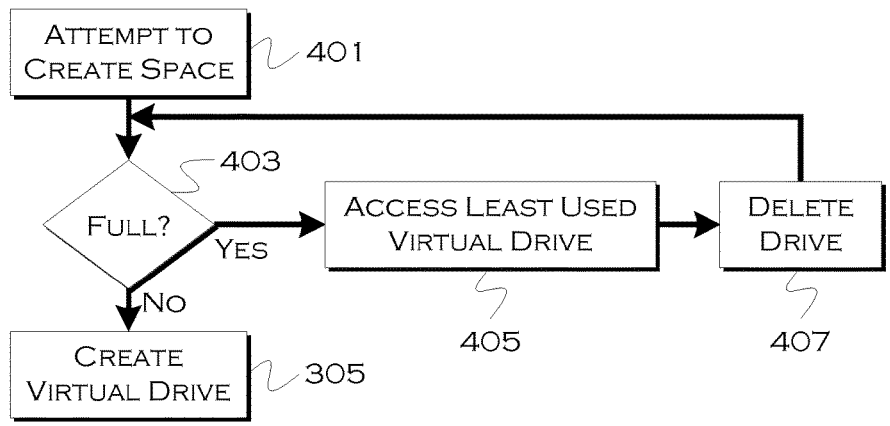
FIG. 4 shows an illustrative process for freeing up memory space.

FIG. 4 shows an illustrative process for freeing up memory space. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process attempts to create space on the vehicle storage, corresponding to a newly connected device 401. If there is insufficient room 403 (if, for example, a minimum virtual drive size is requested), the process will access a least-used virtual drive 405. This virtual drive information will then be deleted 407, despite the key not being necessarily present. In other examples, the process may access and delete the data that has the oldest last-used date, or use some other suitable paradigm for deleting old data that appears to be no longer in use or infrequently used.

Once there is sufficient room on the drive 403, the process will create a virtual drive 305. This drive, as previously noted, will correspond to the newly connected device and be encrypted with the key. There may also be other characteristics associated with the drive (e.g., without limitation, last access time/date, total access time/date, etc.) which can be used if this drive is later subjected to the possibility of deletion to free up space.

Figure 5A:
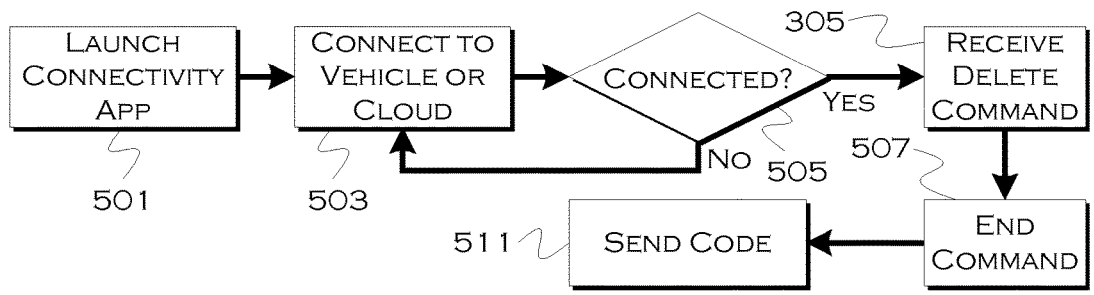
FIGS. 5A and 5B show illustrative processes for removing secure data.
Figure 5B:
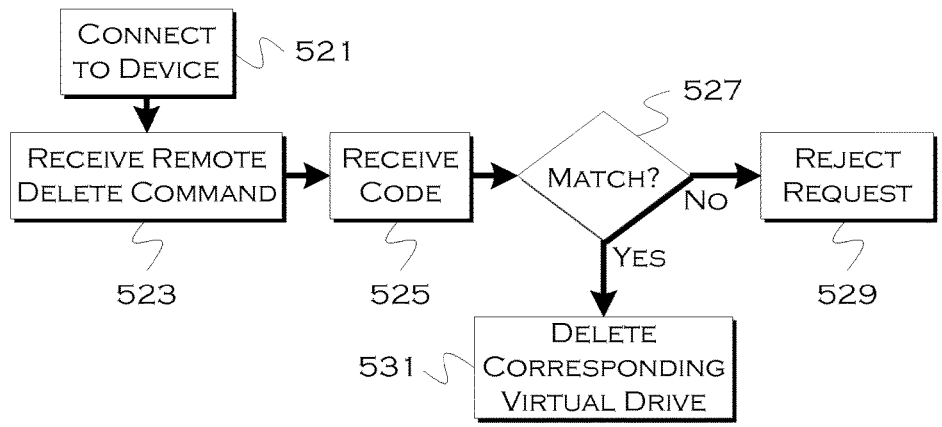

FIGS. 5A and 5B show illustrative processes for removing secure data. With respect to the illustrative embodiments described in these figures, it is noted that a general purpose processor may be temporarily enabled as a special purpose processor for the purpose of executing some or all of the exemplary methods shown herein. When executing code providing instructions to perform some or all steps of the methods, the processor may be temporarily repurposed as a special purpose processor, until such time as the methods are completed. In another example, to the extent appropriate, firmware acting in accordance with a preconfigured processor may cause the processor to act as a special purpose processor provided for the purpose of performing the methods or some reasonable variations thereof.

In this illustrative example, FIG. 5A shows the process from a device-side, and FIG. 5B shows the process from a vehicle-side. This is an example of a process that can be used to delete or alter data when a user, remote from the vehicle, wants to change data on the vehicle, the data corresponding to a device in the user's possession.

In the device-side process, the user launches a connectivity application designed to connect to the vehicle and/or let the user alter data on the vehicle storage 501. The process will try to connect to the vehicle (directly or through an intermediary server) 503. Once connected, the process can proceed. It may be the case that the vehicle is in a location or state that does not allow connectivity. In such a case, the process may be able to queue a delete request on the device or on the intermediary server (if one is present). At a later time, when connectivity to the vehicle is available, the process may finish executing the deletion process. The process or server, based on a queued command, could intermittently try to connect to a previously-unavailable vehicle computer.

Once connected, the process will receive a command from the user (in this case, a "delete" command) instructing interaction with vehicle data 507. The process sends the command to the vehicle 509. In order for the command to be authenticated and to access the appropriate data on the vehicle, the process also sends the encryption code associated with the particular device and stored data 511.

In the vehicle-side process, the process connects to a device (directly or through an intermediate server) 521. Once connected, the process receives a command for data access from the remote device (in this case, also a "delete" command) 523. In order to access the files, to ensure that the requesting device is the appropriate device to request deletion of data that corresponds to that particular device, the process also receives the encryption key 525.

If the encryption key (and any other device identifying data) can be used to match to a virtual drive created for the requesting device at some previous time 528, the process will execute the received command. In this case, that means executing a delete command 531. Otherwise, the process may reject the request 529.

In addition to deleting data upon request, data (some or all virtual storage locations/partitions) may be automatically deleted upon the occurrence of one or more vehicle conditions. In some examples, the driver may request that the data be deleted whenever the driver exits the vehicle. In another example, the driver may request that the data be deleted if a safety restraint system is triggered (indicating an accident). In still another example, the driver may request deletion of the data if a different key (than the key used when the data was created) is used to start the vehicle or, for example, if the vehicle is determined to be being towed (detectable, for example, by vehicle movement in the absence of ignition).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
transfer a newly generated encryption key for a newly paired device to a vehicle computing system and utilize the encryption key to create and encrypt a new virtual storage space, on a processor-connected memory, corresponding to the device and accessible using the encryption key, wherein the processor is configured to delete user data for the device if the processor determines that the vehicle is in an accident.

2. The system of claim 1, wherein the processor is further configured to process a deletion request, input through a vehicle human machine interface (HMI) for data stored in the virtual storage space corresponding to the device while the device is presently connected.

3. The system of claim 1, wherein the processor is further configured to receive a remote data deletion request from the device, and delete the user data stored in the virtual storage space corresponding to the device on the basis of receiving an encryption key from the device, usable to decrypt the data.

4. The system of claim 1, wherein the processor is further configured to determine a different, least-used virtual storage space and delete the storage space to make room for the new virtual storage space if there is insufficient room to create the new virtual storage space.

5. The system of claim 1, wherein the processor is further configured to determine a different, oldest-last-use virtual storage space and delete the storage space to make room for the new virtual storage space if there is insufficient room to create the new virtual storage space.

6. The system of claim 1, wherein the processor is configured to delete the user data for the device if the processor determines that the vehicle is being towed.

7. The system of claim 1, wherein the processor is configured to delete the user data for the device if the processor determines that a key, different from a key used to start the vehicle when the new virtual storage was created, is used to start the vehicle.

8. A computer-implemented method comprising:
generating a new, unique encryption key on the basis of detecting a new device newly paired and connected to a vehicle computing system (VCS);
creating a new virtual space for storing user data retrieved from the new device once the key has been generated;
encrypting the user data with the new encryption key; and
sending the encryption key to the new device; and
automatically deleting all virtual storage spaces if the vehicle is in an accident.

9. The method of claim 8, wherein the creating further includes deleting old virtual storage space associated with a different device if there is insufficient memory space for creation of the new virtual storage space.

10. The method of claim 8, wherein the deleting further includes deleting a least-used virtual storage space.

11. The method of claim 8, wherein the deleting further includes deleting an oldest-last-use virtual storage space.

12. The method of claim 8, further comprising:
receiving a delete data command from the device, when the device is no longer paired with the VCS;
receiving a device encryption key from the device; and
deleting the data if the device encryption key corresponds to the new encryption key generated for the device when the device was newly paired and connected.

13. The method of claim 8, further comprising automatically deleting the user data if vehicle-towing is detected.

14. The method of claim 8, further comprising automatically deleting the user data if a key, different from a key used to start the vehicle when the new virtual storage was created, is used to start the vehicle.

15. A computer-implemented method comprising:
generating a new, unique encryption key on the basis of detecting a new device newly paired and connected to a vehicle computing system (VCS);

creating a new virtual space for storing user data retrieved from the new device once the key has been generated;
encrypting the user data with the new encryption key;
sending the encryption key to the new device; and
automatically deleting the user data if a key, different from a key used to start the vehicle when the new virtual storage was created, is used to start the vehicle.

\* \* \* \* \*